United States Patent [19]

Todd et al.

[11] Patent Number: 5,389,257
[45] Date of Patent: Feb. 14, 1995

[54] METHOD FOR TREATING WATER

[75] Inventors: John H. Todd, Falmouth, Mass.; Barry Silverstein, Jay, N.Y.

[73] Assignee: Ecological Engineering Associates, Marion, Mass.

[21] Appl. No.: 789,075

[22] Filed: Nov. 7, 1991

Related U.S. Application Data

[62] Division of Ser. No. 266,732, Nov. 3, 1988, Pat. No. 5,087,353.

[51] Int. Cl.⁶ .............................................. C02F 3/32
[52] U.S. Cl. .................................. 210/602; 210/621; 210/747
[58] Field of Search ................ 210/602, 630, 620–623, 210/747, 94, 150, 151, 170

[56] References Cited

U.S. PATENT DOCUMENTS

| | | | |
|---|---|---|---|
| 681,884 | 9/1901 | Monjeau . | |
| 2,822,329 | 2/1958 | Griffith | 210/14 |
| 3,155,609 | 11/1964 | Pampel | 210/3 |
| 3,385,786 | 5/1968 | Klock | 210/602 |
| 3,598,726 | 8/1971 | Welch | 210/602 |
| 3,635,816 | 1/1972 | Golub | 210/2 |
| 3,723,304 | 3/1973 | Storck | 210/11 |
| 3,768,200 | 10/1973 | Klock | 210/602 |
| 3,770,623 | 11/1973 | Seidel | 210/2 |
| 3,839,198 | 10/1974 | Shelef | 210/14 |
| 4,008,159 | 2/1977 | Besik | 210/7 |
| 4,086,161 | 4/1978 | Burton | 210/602 |
| 4,093,546 | 6/1978 | Taborsky | 210/150 |
| 4,169,049 | 9/1979 | Salkinoja-Salonen | 210/3 |
| 4,169,050 | 9/1979 | Serfling | 210/12 |
| 4,267,038 | 5/1981 | Thompson | 210/602 |
| 4,277,342 | 7/1981 | Jewell | 210/609 |
| 4,284,508 | 8/1981 | Jewell | 210/603 |
| 4,333,263 | 6/1982 | Adey | 210/602 |

(List continued on next page.)

FOREIGN PATENT DOCUMENTS

| | | | |
|---|---|---|---|
| 3406004 | 8/1985 | Germany | 210/602 |
| 58-70891 | 4/1983 | Japan | 210/602 |
| 2182651 | 5/1987 | United Kingdom . | |

OTHER PUBLICATIONS

Annals of Earth, vol. 5, No. 2 (Aug. 1987).
Chemical Engineering, "Squeezing Energy From Wastewater Treatment," May 12, 1986.
Chemical Engineering, Oct. 14, 1985, p. 11.
Metta Winter, Special to *The Christian Science Monitor*, "How Plant Roots Transform Waste into Clean Water," Apr. 28, 1987.
William J. Jewell et al., "Wastewater Treatment with Plants in Nutrient Films," *Environmental Protection Agency*, Oct. 1983.
William J. Jewell, "Anaerobic Sewage Treatment," *Environmental Science & Technologgy*, vol. 21, No. 1 (1987), p. 16.
"Aquaculture Systems for Wastewater Treatment, An Engineering Assessmentt," EPA Publication No. 4309-80-007, (Jun. 1980).
Solar Aquasystem, Inc. (1978).
Technical Insights, Inc., Jan. 29, 1986.
James Carbone, "Group To Study Apple Pulp Power," *United Press International*, Mar. 15, 1985.

(List continued on next page.)

Primary Examiner—Thomas Wyse
Attorney, Agent, or Firm—Wegner, Cantor, Mueller & Player

[57] ABSTRACT

A method for treating water comprises:

(a) connecting a plurality of tanks each capable of holding water in series such that water can be transferred along the series of tanks from a first tank to a last tank, wherein each of the tanks comprises a bottom and light-transmitting sides;

(b) stocking the tanks with water and organisms for removing pollutants from the water, (c) inputting water containing pollutants to the first tank; and (d) outputting water from which said pollutants have been removed from the last tank.

17 Claims, 7 Drawing Sheets

U.S. PATENT DOCUMENTS

| | | | |
|---|---|---|---|
| 4,333,837 | 6/1982 | Polsz et al. | 210/602 |
| 4,370,233 | 1/1983 | Jewell et al. | 210/609 |
| 4,415,450 | 11/1983 | Wolverton | 210/602 |
| 4,443,337 | 4/1984 | Otaini et al. | 210/602 |
| 4,493,895 | 1/1985 | Colaruotolo | 435/262 |
| 4,582,607 | 4/1986 | Keise et al. | 210/612 |
| 4,732,681 | 3/1988 | Galun et al. | 210/611 |
| 4,774,186 | 9/1988 | Schaefer | 435/257 |
| 4,839,051 | 6/1989 | Higa | 210/602 |

OTHER PUBLICATIONS

"Cornell Tests Plant-Method to Treat Sewage," *United Press International*, Jan. 7, 1986.

Nancy Jack Todd & John Todd, "Bioshelters, Ocean Arks, City Farming-Ecology as the Basis of Design," (1984).

"Assessment of a Semi-Closed, Renewable Resource-Based Aquaculture System," *The New Alchemy Institute*, Progress Report 3, May 20, 1979.

"Assessment of a Semi-Closed, Renewable Resource-Based Aquaculture System, Part I: Experimental Data and Part II: Computer Simulation Model," prepared and distributed Jun. 30, 1982 and Sep. 1981, respectively by John R. Wolfe et al.

John R. Wolfe et al., "A Computer Simulation Model of the Solar Algae Ecosystem," (1986).

METHOD FOR TREATING WATER

This application is a divisional of Ser. No. 07/266,732, filed Nov. 3, 1988.

This invention relates in general to treating waste, and in specific to a method and apparatus for removing pollutants from various types of wastewater, using biologically active organisms and without using chemicals and without producing large quantities of sludge containing pollutants.

BACKGROUND OF THE INVENTION

Urban and industrial communities face the serious problem of how to safely dispose pollutants. The pollutants are often deposited in wastewater, which is of several forms. It may be septage, or sewage.

Septage consists of the contents of residential and industrial septic treatment tanks. The major constituent of residential septage is solid human waste. Human waste often carries with it human pathogens, which are microorganisms that cause illness or otherwise stress humans. Human waste includes biodegradable organic matter either dissolved or suspended, which are quantified by a factor known as the biochemical oxygen demand ("BOD"). BOD is a measure of the degree to which constituents in wastewater will take up free oxygen ($O_2$). The oxygen absorbing constituents are largely decomposing organic matter in a decomposing state. Biological methods of wastewater treatment (discussed below) depend on the presence of sufficient quantities of free oxygen in the water. Typically, biological waste treatment is conducted in part by oxygen breathing bacteria. Thus, a high BOD indicates that the waste in the water is monopolizing all of the available oxygen and "suffocating" any oxygen breathing bacteria that may be present. Septage may also include carbonaceous organic compounds (dissolved and suspended) and nitrogen, phosphorus and potassium, referred to as "nutrients" because they are necessary for the metabolism of organisms, including both microscopic and macroscopic, of the 5 living kingdoms of (plants, animals, fungi, protoctists and monera (bacteria)). Septage also includes paints, oils, cleaning fluids, heavy metals, and other toxins such as "PCBs" (polychlorinated biphenols), "teflon" (polytetrafluoroethylene) etc. A toxin is generally defined as a poison.

The wastewater may also be sewage, which has a much higher liquid content than septage, but which may contain the same types of pollutants mentioned above. Typically, septage is 30-100 times more concentrated than sewage. Typically, sewage has a BOD less than 700 and septage has a BOD of greater than 800.

Typically, sewage enters the municipal sewage system from the user's facility hookup, or through storm drains, and then proceeds to a sewage treatment center, where various treatment methods are applied. Septage, conversely, is collected by tanker trucks as part of regular maintenance when an individual septage tank needs servicing, for example, the septic system becomes clogged or otherwise unusable so that pumping is required. The septage trucks transport the septage to a waste facility and deposit the septage there for treatment.

The principal mode of conventional treatment involves separating out harmful substances from the water in various stages. Particulates are separated using mechanical processes, including filtration, centrifuging and settling. The concentrated particulates are then disposed of in a solid waste landfill. However, these particulates still include the harmful pollutants and landfill must-be considered to be and treated as a hazardous waste site. Additional pollutants dissolved in the water are maintained in coarse suspension or are precipitated from the water by combination with chemicals that reduce their solubility. These additional particulates are then removed as were those in the earlier stages. Finally, pathogens, harmful organisms in the water, are killed by chlorine or other chemicals and also by exposure to ultraviolet light.

The foregoing conventional processes have many drawbacks. The mechanical processes require machinery to move large quantities of water against a pressure gradient and are thus capital intensive. Further, construction and operational costs are extremely high. Large amounts of energy must be applied to the system to effect the filtration and the segregation of the solid particulates from the water. Finally, and most distressingly, in most cases the pollutants are not changed in their basic form, and remain harmful substances. Although they are buried in landfills, they may eventually harm the environment, with the washing of rains and passage of ground water, they return to the hydrological system.

Known systems attempt to minimize the use of chemicals and emphasize the use of biological systems to remove pollutants from sewage. To date, no biological system successfully treats septage. One system passes polluted sewage water through beds of certain living plants to remove certain pollutants. Prior to treatment with the plants, the water is separated from emulsible components, such as oil or tar, which components float in a layer above the water. Coarse suspended matter settles to a sludge layer at the bottom of a settling treatment tank. A two stage living plant filtration system is typical. In the first stage, a plant such as *Phragmites communis*, which has roots extending from nodes, is rooted in a two layer sand bed. The root structure maintains open passageways through the sand so that the water can flow through freely. The upper layer is composed of fine sand, as compared to the lower layer. Slime and other suspended matters which are too coarse to pass through the fine sand filtration bed collect on top. After a suitable amount of slime has collected, the treatment tank is drained and dried out. The slime concentrates into a thin layer which cracks and curls up and is physically removed.

Water leaving the filtration bed contains dissolved material and pathogenic organisms. In the second stage, the water passes through a second bed of sand, in which is rooted a plant such as *Scirpus lacustris*. This plant removes organic compounds and inorganic ions and bacteria from the water. If necessary, additional stages using other plants that remove organic compounds, ions and bacteria not removed by *Scirpus lacustris* may be applied.

It is known that certain plants effectively remove particular dissolved pollutants from sewage. *Scirpus lacustris* (mentioned above) and *Typha angustifolia* remove organic aromatic compounds and pathogenic organisms, including *E. coli*, Salmonella, acid-fast bacteria, Ascarides and Oxyuris. They also effectively remove chemical anions, phosphates, nitrates, sulfates and chlorides.

It is also known that the roots of several species of tall growing bulrushes are effective for removing halogenated phenols such as pentachlorphenol from sewage. In harsh environments, plants must be protected by using a hot house type system. Water laden with pathogens can be purified with vegetation having certain bacterial root nodules. Bacteria live in the nodule. Many types of bacteria produce an antibiotic, which in nature protects those bacteria from other strains of bacteria by killing them. These bacteria can be used in a wastewater treatment system to kill bacteria that are harmful to humans and animals. Known systems cover the surface of the containment vessel with opaque material to prevent access of light to the water, which light makes possible the growth of algae.

This known method has many drawbacks. Principally, it produces large quantities of sludge which must be disposed of. Additionally, the slime can only be removed if the filtration bed is allowed to dry out. Thus, redundant equipment must be available to process the water while the bed is drying out. Further, removing the dried slime is a tedious and labor intensive process and also results in slime, which must be disposed.

Additional known systems for treating sewage (but not septage) use biological methods of wastewater treatment including wetland systems; aquatic plant processes; and combined aqua culture systems.

Wetland methods for sewage treatment use marshes, either natural marshes or man-made marshes. The use of natural marshes must be monitored very carefully so as not to pollute the natural environment. Wetland systems have been used successfully in pilot operations to reduce BOD, suspended solids ("SS"), trace organic compounds and trace heavy metals. However, problems with insects, such as mosquitoes, are prevalent. Further, wetland systems take up huge amounts of surface area. Further, as they mature, they become less effective. Eventually, they become so inefficient that they cannot be used.

Also known for treating sewage are aquatic plant systems where free floating aquatic plants (known as "macrophytes") are used for the treatment or refinement (sometimes referred to as "polishing") of wastewater. Water hyacinth systems may reduce BOD, SS, metals, nitrogen and refractory trace organics. Water hyacinths, however, cannot remove phosphorous in high degrees. An active mass of organisms lives in the root system of the water hyacinths. These organisms play the major role in the chemical breakup of the pollutants. In order to maintain the system, the water hyacinths must be harvested and removed. The amount of plant biomass produced in a water hyacinth pond system is about four times the quantity of waste sludge produced in conventional activated sludge secondary wastewater treatment. This plant mass must be disposed of. Disposal of the plant mass is a problem, as the plant mass will probably have incorporated the pollutants within its structure and may constitute a hazardous waste. Further, the mosquito control is very difficult with water hyacinth systems. Mosquito eating fish must be used.

The use of duckweed rather than or in addition to water hyacinth has been suggested for treating sewage, however, very little data is presented.

Combined aqua culture systems have also been proposed for treating sewage. An aqua-culture system is defined as one that produces a useful biomass from a controlled aquatic media. Examples of a useful biomass are plants that are consumable by either humans or animals. These systems, however, are unacceptably labor intensive.

A method of treating wastewater from citrus processing factories has been proposed which includes introducing the wastewater into a pool containing an absorbent material such as peat moss or shredded paper and a large quantity of earth worms. The peat moss or shredded paper absorbs the pollutants from the liquid and the worms consume the paper or peat moss. Additionally, downstream, fish that feed on the lower end of the food chain (i.e., smaller animals such as plankton), such as Tilapia, are introduced. This method may not be used to treat wastewater containing petroleum oils and/or industrial chemicals, which would destroy the worms.

An aquatic pond stocked with a large number of organisms, such as fish, snails, worms, turtles, pollywogs, bacteria, microorganisms, algae, water lilies and other vegetation has been proposed to further reduce by 80–95% the BOD already reduced by other processes. A method of protecting the aquatic pond against ruin caused by a waste overload from the sewage plant has been proposed. It provides a haven where a seed colony of the aquatic life necessary to re-populate the pond will also (and always) be present due to the constant addition of oxygen saturated water.

Another sewage treatment system has been proposed that includes a stage where solids are decomposed by the action of unspecified anaerobic bacteria, which hydrolyze and ferment complex organic compounds to simple organic acids. An additional stage is provided where the wastewater is treated with activated carbon and a mixed microbial population, which removes organic matter, organic nitrogen, ammonia ($NH_3$) and nitrogen in the forms of nitrate ($NO_3$) and nitrite ($NO_2$) from the processed wastewater. However, chemicals must be used to remove phosphates and a chemical coagulant and additional chemicals such as hypochlorite are added. Ozone ($O_3$) is also added to the wastewater, which may result in chlorinated compounds, a potential health hazard.

Another sewage treatment system has been proposed using a combination of natural ecological processes, including: an aerated lagoon; submerged, high surface area, activated bio-web substrates providing a fixed bacterial film; floating aquatic plants for nutrient (pollutant) removal; a polyculture of micro-invertebrates, fish, and shell fish in a balanced food chain for removal of nutrients and organics from the wastewater and concentration into a biomass. A solar heated greenhouse-type cover is disclosed to prevent the system from damage due to cold. Drawbacks of this system are that management is time consuming; it is difficult to maintain physical segregation between oxygenated and unoxygenated zones.

It has been disclosed that certain bacteria plasmids (small molecules of DNA) enable bacteria to degrade obnoxious halogenated organic wastes, such as chlorinated aromatic compounds.

A process for the purification of polluted water has been proposed including applying aquatic plants to the water. The method is particularly directed towards non-punctiform pollutants, such as fertilizers. The system has four different types of plant zones: a swamp zone, a marsh zone, a reed zone, and a quaking bog. This system suffers from seasonal fluctuations in functionality; senescence; excessive cleaning requirements and bad effects on ground water.

It has also been proposed to purify sewage using an expanded bed reactor containing film upon which grow methane producing anaerobic bacteria. This system must be shielded from light, because the bacteria cannot tolerate light.

All of the foregoing methods suffer from certain drawbacks, as have been discussed.

BRIEF DESCRIPTION OF THE INVENTION

The invention relates to both a method and an apparatus for treating wastewater, including sewage and septage, by removing unwanted substances therefrom. Both the method and the apparatus use biological cleansing elements. The invention is particularly effective in its capacity to treat septage, a very concentrated form of waste containing fluid.

The apparatus features, in a preferred embodiment, a multistage course through which the wastewater will flow, the course comprising a first plurality of energy transmitting treatment tanks situated so that electromagnetic energy, including light, may be transmitted throughout substantially all of the wastewater therein. A diverse plurality of types of microorganisms are provided in the treatment tanks. The microorganisms include bacteria, protoctists, fungi, plants and animals. The Course further includes a second plurality of energy transmitting treatment tanks also situated so that electromagnetic energy, including light, may be transmitted throughout substantially all of the wastewater therein, and is stocked with a diverse plurality of non-aquatic plants. The plants are supported on fixtures, so that the plant roots extend into the wastewater flowing through the second plurality of treatment tanks. The course also has a marsh in which grow a plurality of varieties of marsh plants and a third plurality of energy transmitting treatment tanks is provided, also situated so that electromagnetic energy, including light, may be transmitted throughout substantially all of the wastewater therein. A plurality of species of higher animals, including zooplankton, phytoplankton (algae) fish and mollusks such as snails and fresh water clams are provided in the second and third pluralities of tanks. In relatively cold climates, a greenhouse must be provided to maintain the system warm enough during the winter for the plants and animals to grow. The wastewater is caused to flow through all of the pluralities of treatment tanks and through the marsh. The biological activity of the species of bacteria, plants and animals purifies the wastewater.

An important aspect of the apparatus is that the treatment tanks transmit energy into the wastewater substantially throughout its entire volume. The treatment tanks may transmit energy through their outer walls, preferably 100% around their perimeter and over their full height. The energy is predominantly in the wavelengths of light, both visible and non-visible. A large surface area for energy transmission allows for a very active and populous photosynthetic microorganism population, both aerobic and anaerobic, from top to bottom of the treatment tanks and around their perimeter throughout the entire volume. The photosynthetic microorganisms occupy a substantial portion of the surface area of the treatment tanks. This arrangement has spawned communities of organisms which have not been seen before either in such quality or such quantities. Known biological sewage treatment systems have only used conventional, in-ground pools. Light is transmitted only through the upper surface of the water. In many known systems, in fact, only minimal light is transmitted, due to shading by water plants.

The method of the invention comprises the steps of providing the apparatus described above and initially stocking it with plants, animals and microorganism as described above. The microorganisms stocked in the first two pluralities of tanks include bacteria and algae. The microorganism populations must be restocked frequently to maintain high diversity of types.

The method also includes the step of agitating the wastewater contained in the treatment tanks, through aeration and other means, to prevent sludge from settling in the bottom of the treatment tanks and to keep particulates spread throughout the full volume of the treatment tank. This permits virtually all of the contaminants in the wastewater to be removed from the wastewater by the organisms living therein, rather than allowing the contaminants to settle to the bottom. Agitation through aeration also introduces oxygen ($O_2$) into the treatment tanks. This replaces free oxygen taken up by decaying biodegradable organic compounds. Free oxygen is needed by aerobic bacteria, which metabolize and thus degrade many pollutants.

It is beneficial to maintain as diverse a population of types of bacteria and other microorganisms as is possible. Different pollutants serve as nutrients for different microorganisms. Maintaining a large variety of types of microorganisms facilitates the removal of a large number of different nutrients in different forms. Further, it is beneficial to maintain various types of bacteria that are redundant with respect to their nutrient needs, and that vary with respect to their survivability in harsh environments (e.g. temperature, light, antibiotic variations) so that given any of a variety of environmental pressures, there will be present a type of bacteria that can withstand the environment and metabolize the nutrients. Variety in bacterial types is discussed in *A New Bacteriology*, by Sorin Sonea and Maurice Panisset, Jones & Bartlett Publishers, Inc. (1983), New York, published first in French in 1980 by Les Presses de l'Universite de Montreal.

It is also an aspect of the method of the invention to recycle a small but significant volume of the partially treated wastewater from various mid-stages of the flow course back to earlier stages, including the input. Recycling provides a means of automatically maintaining a higher level of diversity of microorganisms at the earlier stages, primarily the input, where conditions are harshest.

Finally, it is an aspect of the method of the invention to maintain in the first treatment tank the ratio, by weight, of the amount of carbon, in the form of calcium carbonate, to the amount of ammonia and dissolved nitrates, within a specified range. It has been found that this ratio provides the appropriate amount of carbon for nutrition to the growing microorganisms.

OBJECTS OF THE INVENTION

Thus, several objects of the invention are to provide an apparatus and a method for treating wastewater by removing unwanted substances therefrom:
 by using biologically active organisms;
 without using chemicals that are harmful to the environment;
 without producing large quantities of sludge that contain pollutants;
 that effectively removes biodegradable organic contaminants;

that effectively removes paints, oils, cleaning fluids, heavy metals and other toxins;

that can be used to treat septage;

that can be used to treat sewage;

that requires a capital expenditure lower than conventional waste treatment systems;

that is easy and quick to construct;

that requires a relatively low operating budget as compared to conventional treatment systems;

that does not place harmful chemicals in the natural environment;

that is flexible and responsive to changes in the contents of the unwanted substances in the wastewater;

that requires relatively low amounts of energy to operate;

that can be added to conventional waste treatment systems as a retrofit module;

that can be used over a wide range of temperature and light conditions;

that can be used in developing countries;

that can be used in conjunction with a natural marsh wastewater treatment system;

that can purify sewage and septage to a degree that it may be returned to the natural water system; and that can treat sewage and septage without the formation of sludge or biomass, such as plants, fish, etc., that contain hazardous materials.

Other objects of the invention will be evident from consideration of the following description of preferred embodiments and the figures of the drawing.

FIGURES OF THE DRAWING

DETAILED DESCRIPTION OF PREFERRED EMBODIMENTS OF THE INVENTION

Figure 1:
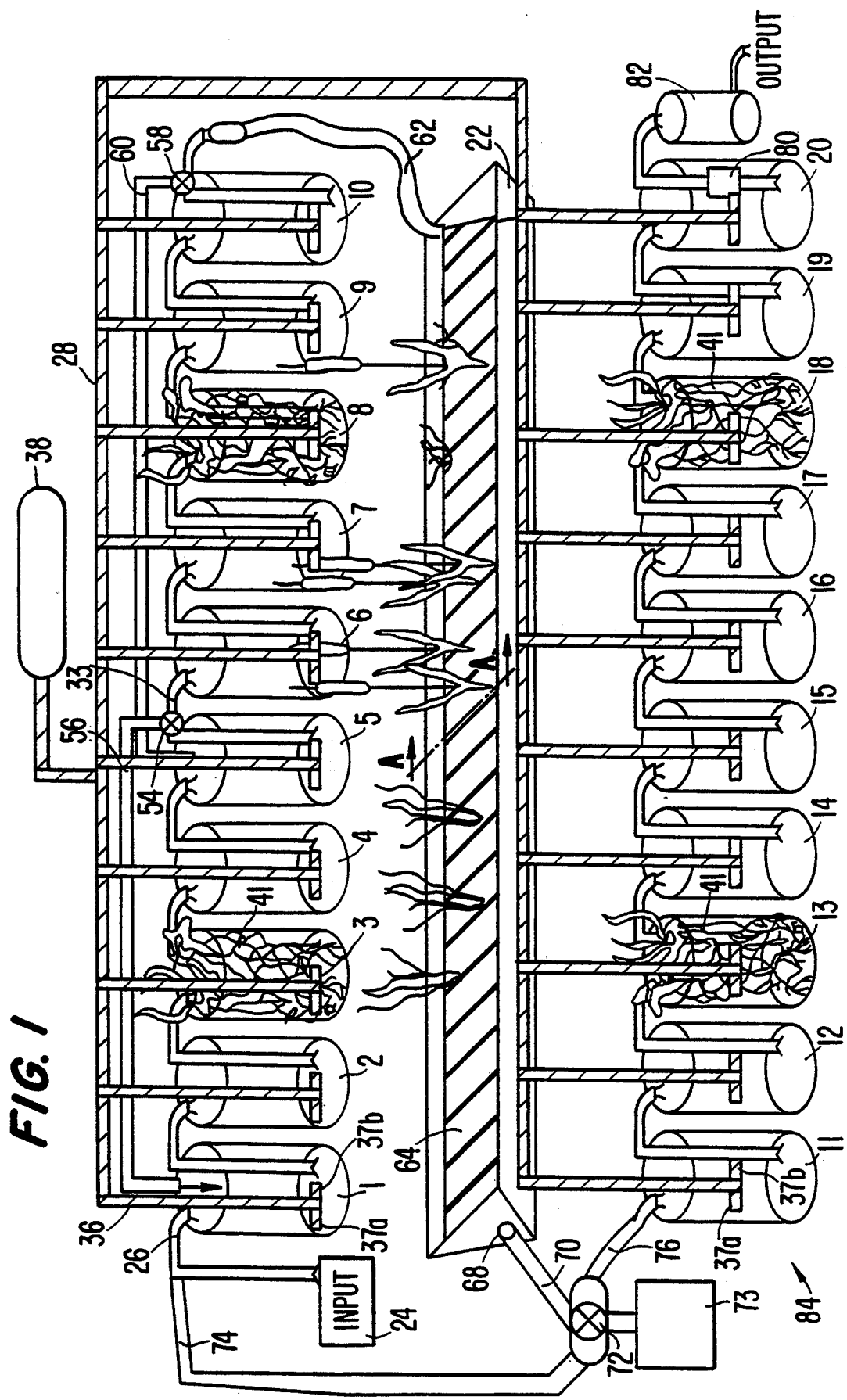
FIG. 1 is a schematic perspective view of the apparatus of the invention, showing the multiple stage flow course including a plurality of stages of treatment tanks, and an artificial marsh.

Referring to FIG. 1, a schematic diagram of a perspective view of the apparatus of the invention is shown. A plurality of energy transmitting treatment tanks (1-20) form a flow course, sometimes referred to as "an artificial river", through which wastewater, for instance, septage, that bears pollutants passes. For purposes of clarity, some of the components of individual treatment tanks 1-20 are omitted from FIG. 1. The structure of an individual treatment tank, for instance tank 1, is discussed below with reference to FIG. 2. The hookup of the treatment tanks to each other, and to the wastewater input and output is also discussed below. An artificial marsh 22 is placed approximately mid-way along the course of the artificial river of treatment tanks. Wastewater is provided to the system at input 24. Depending upon whether the wastewater is in the form of septage or sewage, The input may be either an underground holding tank or an open lagoon (in the case of septage) or may be any stage of a municipality's sewage treatment system, from the raw sewage to fully treated sewage. From input 24, the wastewater is introduced through pipe 26 to treatment tank 1. Treatment tank 1 is the first of a first plurality of treatment tanks all arranged so as to receive a high amount of electromagnetic energy, including light.

Figure 2:
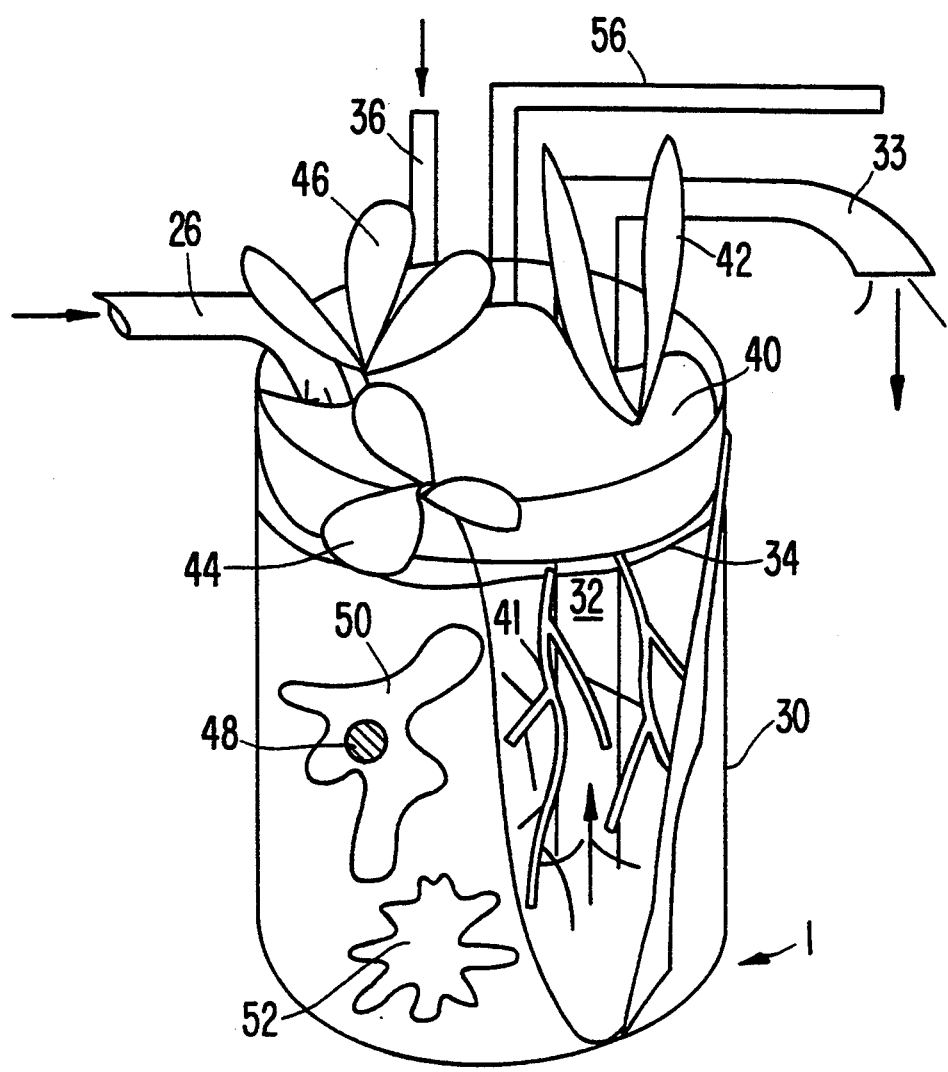
FIG. 2 is a schematic perspective view, with parts broken away, of a preferred embodiment of a treatment tank of the apparatus of the invention.

Turning now to FIG. 2, the structure of a typical treatment tank in a preferred embodiment, treatment tank 1, will be reviewed. The treatment tank is a cylinder 30 approximately one and a half to two meters high and one and a half to two meters in diameter, which transmits electromagnetic energy, including light. The wall thickness is approximately 1.1 mm (0.045 in). The wastewater enters cylinder 30 through pipe 26. Wastewater leaves cylinder 30 through standpipe 32. Water is siphoned up standpipe 32 from the bottom of the treatment tank 30 and into the adjacent treatment tank (in this case treatment tank 2). Alternatively, gravity feed can be used by having the upper extension of standpipe 32 remain below the water level of the tank in which it stands. For the embodiment shown, standpipe 32 is approximately 5 cm (2 in) in diameter.

Air is provided below the water level 34 through pipe 36 and airstones 37a, 37b, which receive air that has been compressed by compressor 38 (FIG. 1) through pipes 28 and 36. The number of airstones per treatment tank varies from treatment tank to treatment tank, depending upon the oxygen needs of the biota in each particular treatment tank.

A floating support 40 is provided in each treatment tank. (For clarity, supports 40 are not shown in FIG. 1. Plants 41 supported by such supports 40 are shown in treatment tanks 3, 8, 13 and 18. However, it should be understood that the floating supports 40 and the plants supported thereby (discussed below) are provided for each of the treatment tanks 1-20.) Supports 40 may be of styrofoam or of wooden lattices or any other structure that will physically support a mass of plants above the surface of the wastewater, while allowing the roots of the plants to pass through the support and into the wastewater. Further, the supports should be easily removable, in order to harvest the plants, or to service the mechanical components, or the wastewater in the treatment tank, or to move the plants to another location in the system, as discussed below. As shown in FIG. 2, a plurality of plant species 42, 44, 46 (shown schematically only) are supported by support 40. The roots 41 of the plants extend deep into the wastewater, substantially to the bottom of a treatment tank. (It will be understood that even in FIG. 2, the number of plants has been reduced below a realistic amount, in order to prevent the figure from becoming overly cluttered.)

Returning now to FIG. 1, the plumbing among the treatment tanks 1-10 will be explained. As has been mentioned, wastewater flows through standpipe 32 from treatment tank 1 into treatment tank 2 and similarly from tank 2 to tank 3, tank 3 to tank 4 all the way to treatment tank 10. Similarly, compressed air from compressor 38 is introduced into each treatment tank through pipe 28 and a respective line 36. Airstones 37a and 37b introduce the air into the treatment tank as a multitude of bubbles, and disperse the air generally throughout the water in the treatment tank. For the embodiment shown, with a daily septage influent BOD of 1,000 mg/l and suspended solids of 200 mg/l, dissolved oxygen should be maintained at 5 mg/l or greater. 50 scfm transfers 56 pounds of dissolved oxygen per day into the wastewater.

At various stages of the artificial river, some wastewater is recycled. In the embodiment shown in FIG. 1, wastewater from the output pipe 33 is directed by pump and valve assembly 54 back through pipe 56 to input to treatment tank 1. Similarly, output from treatment tank 10 is directed by pump and valve assembly 58 through pipe 60 into treatment tank 5. Thus, through the combination of the recycling pipes 60 and 56, some wastewater from treatment tank 10, along with the small organisms living therein will be recycled all the back to treatment tank 1. Recycling from other locations to other locations is also possible.

In the embodiment shown in FIG. 1, the wastewater leaving treatment tank 10 next passes through an artificial marsh 22. For a system of the size shown in FIG. 1, the artificial marsh is constructed in a plywood frame 86 having a triangular cross-section approximately 1 meter wide at the top and approximately ½ meter deep at the bottom apex. The plywood 86 is lined with a plastic or suitable waterproof material 88 so that the environment is maintained in control. The length of the marsh is approximately 40 m. (116 ft.). The plywood frame is filled for its entire length with sand 64. The marsh is inclined so that the input, near line 62, is higher than the output at the opposite end. Various species of plants are provided in the marsh. The selection and function of the plants will be discussed below.

The marsh has an output 68, which is connected through pipe 70 to a T-valve 72 and pump 73. Through action of the pump 73 and T-valve 72, approximately 10% of the flow of partially treated wastewater is redirected through pipe 74 to the input of treatment tank 1. The remaining 90% travels through pipe 76 into the input of treatment tank 11. Treatment tanks 11-20 are connected to each other in the same manner as were treatment tanks 1-10, however, no feedback, such as through pipes 60 and 56 is provided. Feedback may be provided but the benefits received are usually minimal, due to the lower levels of microbial activity downstream, due to the lower nutrient level of the partially treated water.

Treatment tank 20 is equipped with an air pump and fiberglass-type filter 80, to provide a pH buffer and additional denitrifying capacity. The output of treatment tank 20 is directed to a sand filled filter treatment tank 82, which additionally removes plankton and other suspended solids. After passage through the sand filter 82, the treated wastewater can be passed through an ultraviolet light chamber (not shown) for sterilization.

The method of treating wastewater using the basic apparatus described above is described below. Once the apparatus has been provided, each of the treatment tanks 1-20 is filled with clean water. The flow through treatment tanks 1-10 and 11-20 is initiated. Cuttings of the plants selected for growth in the plant supports 40 are inserted in the supports 40 and the supports 40 are placed in each of the respective treatment tanks 1-20. The selection of plants is discussed below. Marsh plants are also planted in the marsh with specific plants being placed in specific locations along the length of the marsh.

Microorganisms and phytoplankton (algae) and small animals including zooplankton are seeded in treatment tanks 1-10. Initially, each of the treatment tanks is seeded with an identical compliment of microorganisms. The treatment tanks are seeded with a wide diversity of bacteria including the following: Bacillus, Pseudomonas, Nitrobacter, Nitrosomonas, Cellulomonas, Aerobacter, and Rhodopseudomonas. In addition, microorganisms are ubiquitous and are supplied by the influent, on the roots of the plants added to the system, and from the atmosphere. Therefore, all of the types of microorganisms present cannot be identified. One such microorganism which has been identified is Anabaena.

In addition to the microorganisms, treatment tanks 11-20 are stocked with higher animals. All are stocked with several varieties of mollusks, including snails, including Lymnaeidae (right hand) and Planorbidae (ramshorn) and fresh water clams, including Unio and Ondonta. Plankton is introduced at treatment tanks 15 and 16 and move downstream with the effluent. Small-mouthed bass and river trout are stocked in treatment tanks 16, 17, 18 and 19 and Plecostomous (suckerfish) are also provided in treatment tank 19.

Turning now to the types of plants that are used, in general, the plants in the treatment tanks 1-20 and the marsh 22 should be young and at a stage of high growth, to maximize nutrient uptake. In an experimental septage treatment system established at Harwich, Mass., the following plants are used as indicated. Treatment tank 1 is provided with a large willow and water willows which are supported by plant supports 40, and water starwart. Treatment tank 2 is provided with a water willow plant and willow cuttings, again supported by a support. Treatment tank 3 has water hyacinths, a water plant which floats on the surface and does not require a support. Treatment tank 4 is provided with the floating plant star duckweed. Treatment tank 5 is provided with willow cuttings which must be supported. Treatment tank 6 is provided with buttonbush and water willow, both of which must be supported. Treatment tank 7 is provided with umbrella plants, tomato plants, nasturtium and eucalyptus, all of which are supported, and the floating plants pondweed and water starwart. Treatment tank 8 is provided with supported willow cuttings and floating water hyacinths. Treatment tank 9 is provided with floating water hyacinths and supported tomatoes, nasturtium and pokeweed. Treatment tank 10, just before the marsh, is provided with fragrant water lily and pickeral weed, both of which must be supported, along with water hyacinths.

After the marsh, treatment tank 11 is provided with supported tomatoes and nasturtiums. Treatment tank 12 is provided with floating duckweed. Treatment tanks 13 and 14 are provided with floating hyacinths and duckweed. Treatment tank 15 is provided with supported pickeral weed and fragrant water lily and floating hyacinths. Treatment tank 16 is provided with tomatoes, nasturtium and water hyacinth. Treatment tank 17 is provided with floating water hyacinths and tomatoes, nasturtium and eucalyptus. Treatment tank 18 is provided with floating duckweed and supported pickeral weed. Treatment tank 19 is provided with supported nasturtium and eucalyptus. Treatment tank 20 is provided with floating Azolla. The roots of Azolla provide a habitat for the nitrogen fixing bacteria Anabaena. It will be understood that this list is illustrative only, with respect to both species and location. It is possible to place specific plants in different locations. It is also often beneficial to move the plants from place to place, as they grow and mature, and as the seasons change.

Turning now to the plants grown in the marsh 22, the plants include *Scirpus lacustrus* (bulrushes), *Iris pseudacorus* (yellowflag), *Typha spp* (cattails) and other plant species having nonbactericidal and antiviral action. As with the plants growing in the treatment tanks, these plants are illustrative only.

After the system has been stocked as described above, the flow from the input source 24 is begun at a flow rate of approximately 1,200 gals per day for the tank size described above. Each treatment tank holds approximately 600 gallons of wastewater. The wastewater remains in each treatment tank for approximately twelve hours, thus providing for an overall retention time through the twenty treatment tanks and the marsh of approximately ten days. If artificial lighting is used, as discussed below, the throughput can be increased. Natural sunlight, applied to septage retained in treatment tanks described above provides enough energy to treat 1,200 gallons per day, during the summer months at Harwich, Mass. U.S.A.

Figure 4:
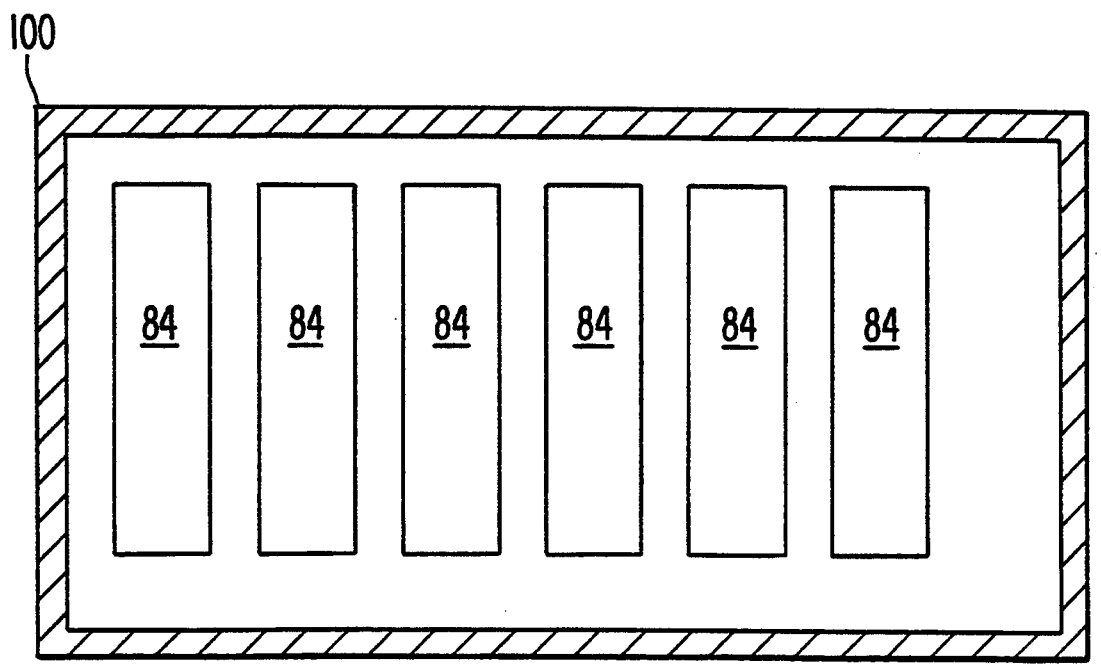
FIG. 4 is a schematic plan view of several modules of the apparatus of the invention housed in a greenhouse.

As will be discussed in more detail below, a beneficial result is obtained from using treatment tanks of approximately two meters in diameter. Thus, the overall size of the treatment tank system using natural light and simple cylindrical treatment tanks, is limited to roughly the size of the system illustrated in FIG. 1. It is possible to extend the height and diameter of the treatment tanks slightly, increasing the capacity by perhaps a factor of two. However, the system described in FIG. 1 is easily used in parallel with any number of identical systems, as shown schematically in FIG. 4, thereby creating a system of any desired capacity. The system 84 shown in FIG. 1 having twenty treatment tanks should be considered to be a module of a specified cleaning capacity. Other configurations of treatment tanks are possible, as discussed below.

Before the wastewater has passed through the entire course of treatment tanks 1-20, it may be necessary to provide nutrients to the microorganisms and plants stocked in the downstream treatment tanks. Or, alternatively, the downstream treatment tanks can be stocked at a respectively later time than the upstream treatment tanks, timed to coincide with the first arrival of the partially treated wastewater.

As has been mentioned, initially, all of the first ten treatment tanks are stocked with identical assortments of microorganisms. However, as the system achieves relative stability, certain types of microorganisms predominate at various stages along the treatment tank course and different types of microorganisms either die or decrease greatly in number.

In this context, the importance of the electromagnetic energy transmitting treatment tanks will be understood. The treatment tanks are of a thin, 1.1 mm (0.045 in), fiberglass, which transmits a spectrum of electromagnetic energy, including all light energy except for ultraviolet light. The treatment tanks need not be of the thin material, so long as the treatment tanks transmit this spectrum of electromagnetic energy. The above-mentioned material is adequate and due to its thin-wall size, is relatively lightweight, inexpensive and easy to set up. Because the treatment tanks transmit electromagnetic energy, in particular light, of various bandwidths, into the wastewater around the entire perimeter of the treatment tank and over its entire height, a high amount of electromagnetic energy is available for the use of photosynthetic and other microorganisms. This is so even in the case where leafy plants, such as water hyacinths, completely cover the water surface of the treatment tank. In known septage and sewage systems, such high degree of light energy has never been provided, and has, in fact been discouraged due to the perceived disadvantage of high algae growth.

As the system achieves equilibrium, the walls of the upstream treatment tanks (e.g. tanks 1-5) become covered with many different types of photosynthetic bacteria and microorganisms, including various types of cyanobacteria, both purple and green. The coating of biota on the walls grows to a thickness of approximately 3 mm (0.125 inches).

A by-product of photosynthesis is oxygen gas ($O_2$), which is used by aerobic microorganisms. Aerobic organisms cannot take direct advantage of energy in the form of light to produce $O_2$.

Natural systems that have been evaluated to-date have not shown such a large quantity and such a large variety of photosynthetic microorganisms as exist in the treatment tanks operating in accordance with the invention. This is because most natural systems, such as ponds or streams, are designed to admit electromagnetic energy in the form of light only through the surface, however, that surface is often covered with plants. In the treatment tank system of the present invention, the large quantity of admitted light is unique. Thus, even microanimals (as distinguished from bacteria) with photosynthetic capacity have been observed.

Photosynthetic activity results in the consumption of nutrients and the production of oxygen gas ($O_2$). As has been discussed above, raw septage has a characteristically high BOD. A typical BOD for septage influent is greater than 1,000 mg/l (or 1,000 ppm). The photosynthetic bacteria, which produce $O_2$, such as cyanobacteria, are anaerobic and thus do not need oxygen to grow. The oxygen produced by the bacteria is taken up by the organic material in the waste responsible for the high BOD, thus reducing the BOD.

Various types of photosynthetic microorganisms are capable of using different bandwidths of the electromagnetic energy spectrum for photosynthetic energy. Water attenuates the transmission of electromagnetic energy as a function of its wavelength. Shorter wavelength electromagnetic energy is dampened more quickly than that of longer wavelength. Thus, microorganisms that can only use the shorter wavelengths are more commonly found closer to the surface than are microorganisms that can take advantage of longer wavelengths. After transmission through one meter of water, all of the useful electromagnetic energy has been absorbed by the water. Therefore, no photosynthetic activity can occur more than approximately one meter from an energy admitting source.

Figure 5:
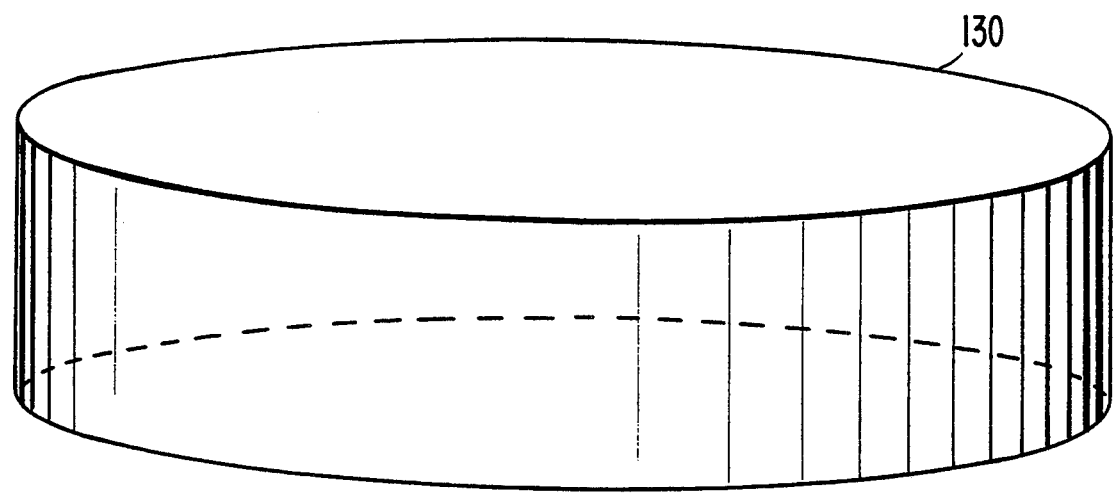
FIG. 5 is a schematic perspective view of a preferred embodiment of an oval treatment tank of the apparatus of the invention.
Figure 7:
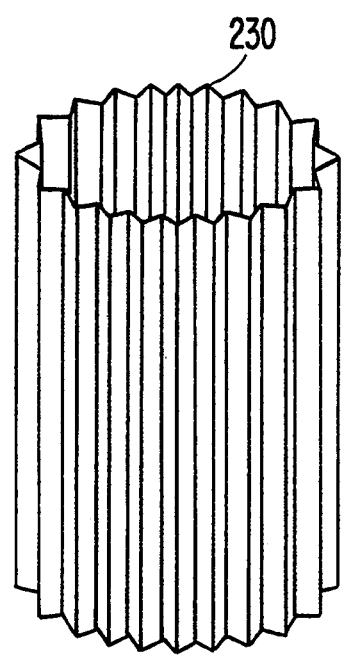
FIG. 7 is a schematic perspective view of a preferred embodiment of a treatment tank of the apparatus of the invention having a large surface area.

Thus, in the case of the treatment tanks of the present invention, virtually no photosynthetic activity can take place more than one meter from a surface at which light enters the wastewater. Thus, for a basic embodiment of the invention, the maximum diameter of the treatment tank 30 for which photosynthetic activity across the entire width and depth of the treatment tank 30 can be expected is approximately two meters. It is possible to increase the effective photosynthetic volume of a treatment tank by providing a long oval tank 130 having a minor axis of less than two meters (FIG. 5). It is also possible to use treatment tanks 230 having a corrugated surface (FIG. 7) to increase the surface area and light transmitting capacity, thereby increasing the microbial diversity and thus the photosynthetic activity. Alternatively, needle-like or comb-like projections can radiate inward from the walls.

Figure 6:
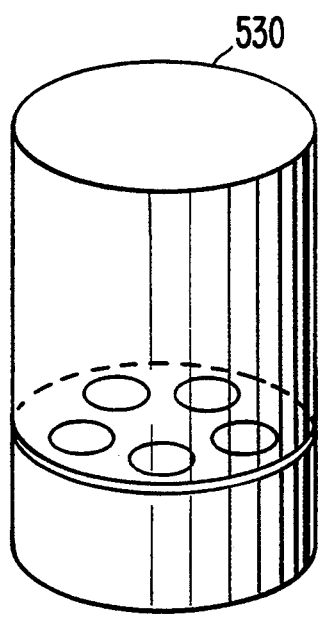
FIG. 6 is a schematic perspective view of a preferred embodiment of a bottom lighted treatment tank of the apparatus of the invention.
Figure 8:
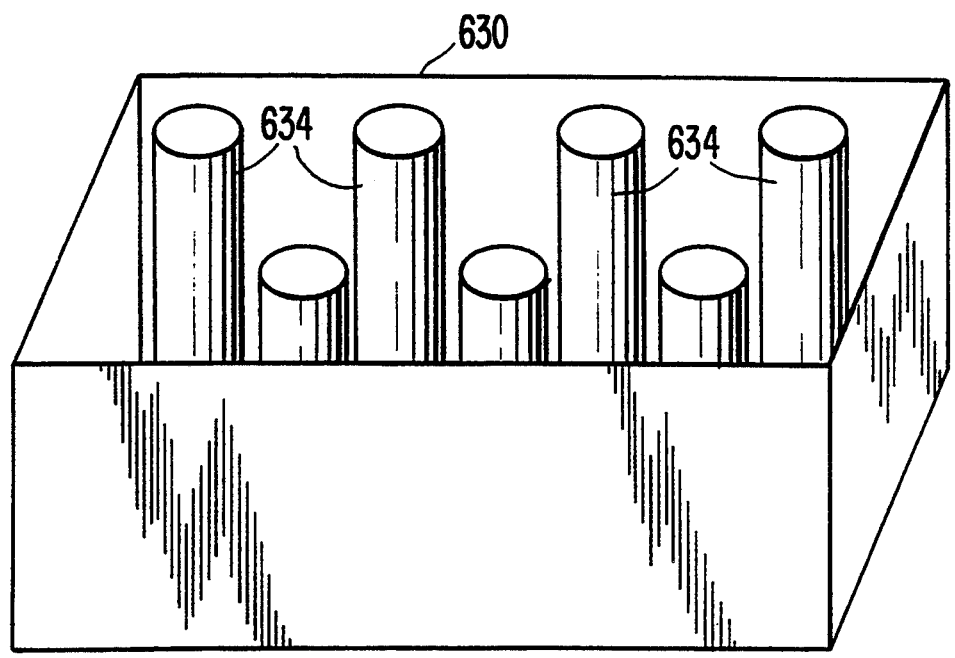
FIG. 8 is a schematic perspective view of a preferred embodiment of a treatment tank of the apparatus of the invention having light chimneys.
Figure 9:
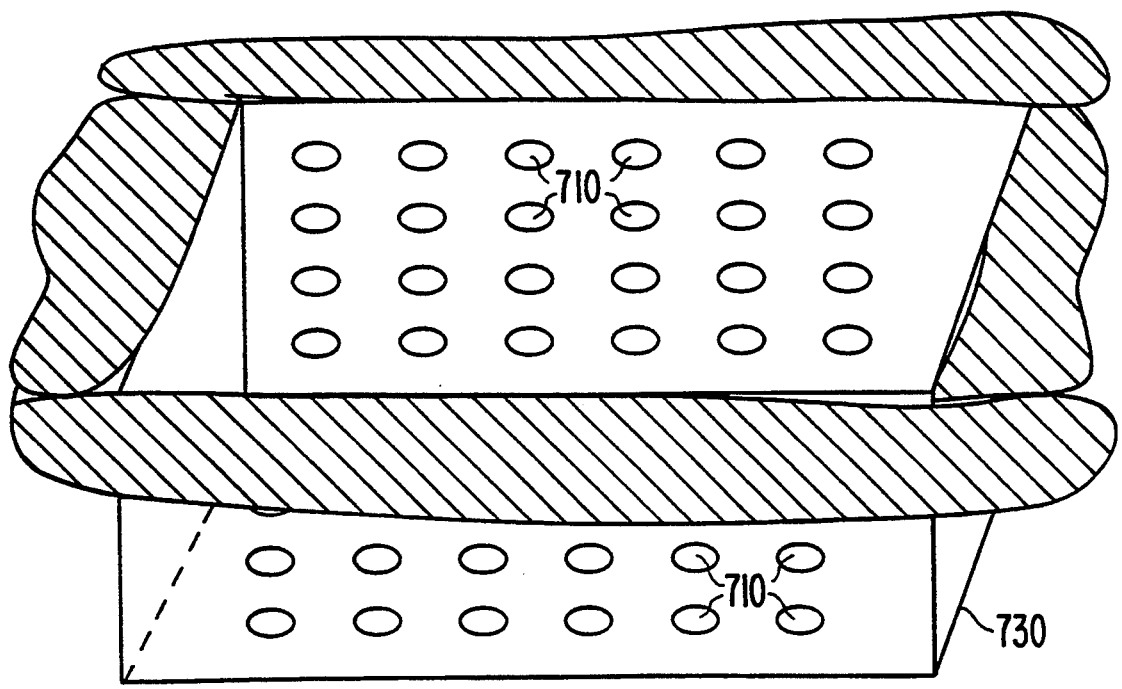
FIG. 9 is a schematic perspective view of a preferred embodiment of a treatment tank of the invention that is below ground and artificially lighted.
Figure 10:
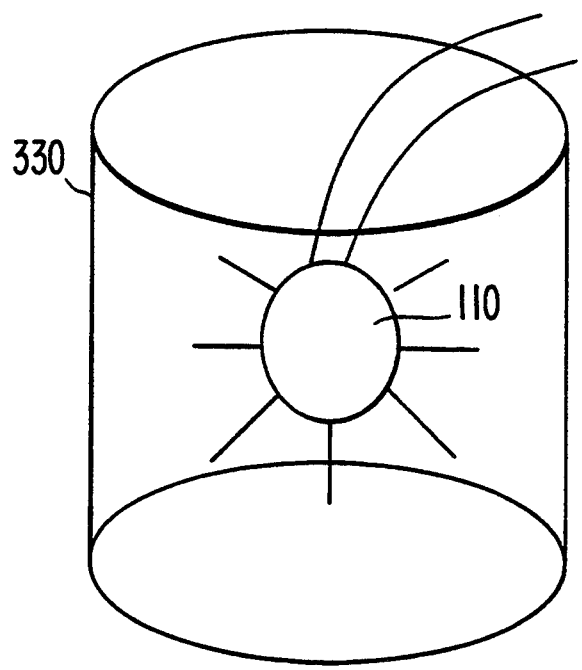
FIG. 10 is a schematic perspective view of a preferred embodiment of a treatment tank of the apparatus of the invention that has an internal light.
Figure 11:
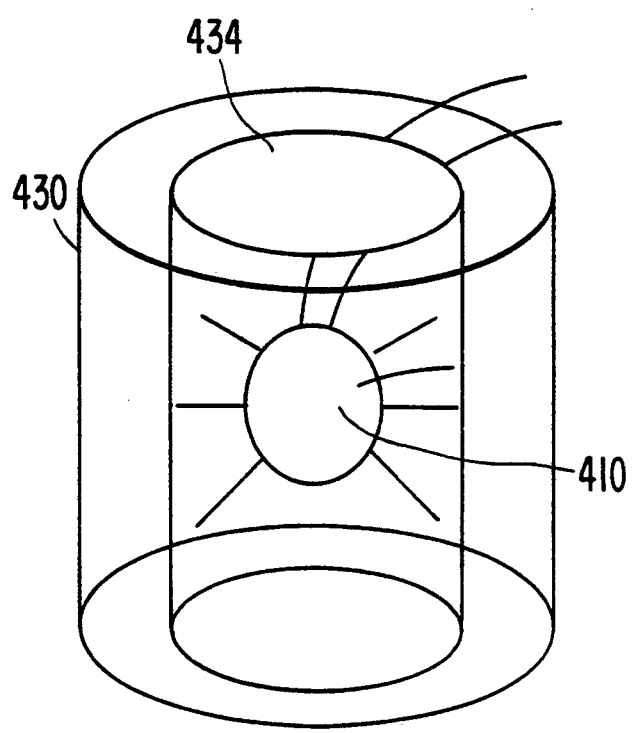
FIG. 11 is a schematic perspective view of a preferred embodiment of an annular treatment tank of the apparatus of the invention that has an internal light.

It is also possible to exploit artificial light and to provide a treatment tank 330 (FIG. 10) of approximately 4.5 meters in diameter and providing an axially located artificial light source 110. The artificial light source 110 may be a submersible light. Alternatively, a concentric, translucent light transmitting chimney 434 (FIG. 11) may be provided in the center of a treatment tank 430 into which can be hung a conventional light source 410. In this manner, an annulus two meters thick can be effectively used. Additional schemes of artificially illuminating tanks can be devised, such as lighting the bottom of the tanks 530 (FIG. 6), or providing a plurality of light transmitting chimneys 634 (FIG. 8) inside a large pool 630 (FIG. 8). If artificial lights 710 are used it is not necessary that the treatment tanks be situated above ground. They may be below ground, such as with conventional pools 730 and tanks (FIG. 9). Further, if artificial light is used, the system also operate at night, when natural light is unavailable.

The light absorbing property of water, coupled with various bacteria's narrow frequency band energy requirements and anaerobic nature, limit the amount of photosynthetic activity in open surface, below water, unlighted tanks such as those conventionally found in previous "natural" treatment systems. Most photosynthetic anaerobic bacteria cannot tolerate oxygen. At the surface of a pool, oxygen content is sometimes high, due to mixing caused by wind and waves. Thus, anaerobic, photosynthetic bacteria which require the shorter wavelength light cannot survive. These bacteria can survive, however, in abundance in the treatment tanks of the present invention.

In addition to the photosynthetic anaerobic and the aerobic schemes for energy production, a third mechanism, which capitalizes on energy in certain molecules exists. Chemoautotrophy uses $CO_2$ and energy bound up in hydrogen sulfide ($H_2S$), ammonia ($NH_3$) and methane ($CH_4$) gases. These organisms dominate in dark, oxygen poor regions where $H_2S$, $NH_3$ or $CH_4$ are present. They cannot survive in highly lighted areas.

Turning now to the plants supported at the surface of the treatment tanks, the principle function of the plants is to provide a physical environment or substrate for the growth of the microorganisms that will metabolize the pollutants. It is important that the upstream plants be of a type that will quickly establish an extensive and sturdy root structure, extending deep into the wastewater, substantially all the way to the bottom of the treatment tank. As the wastewater in the treatment tank is stirred-up, by the aeration delivered through pipe 36, as a result of the suction of wastewater from the bottom of the treatment tank up through standpipe 32, and by fish foraging in treatment tanks 15–20, solid particulates will be dispersed uniformly throughout the treatment tank and eventually will become trapped in the root system of the plants. In the root systems tiny local environments will arise. Some will be aerobic, where oxygen bubbles from the aeration are trapped. Others will be anaerobic where no oxygen is present. Others will be combinations thereof with lower levels of oxygen.

In the first few treatment tanks, it is believed that purple cyanobacteria break down toxins, such as phenols, benzenes, chloramines, pesticides and herbicides. Rhodopseudomonas, an anaerobic bacteria, uses light energy to oxidize organic compounds. The fermentation products provide nutrients for other bacteria. During this first stage also, heterotrophic bacteria (those bacteria which metabolize organic material) Bacillus and Pseudomonas, remove soluble compounds. Bacillus oxidizes a variety of carbohydrates, organic acids, fats, oils, proteins and starches. These two bacteria receive oxygen from the metabolism of the substances mentioned above, and thus, the aeration and oxygen production of the photosynthetic and aerobic bacteria is very important. Soluble organic chemicals are removed according to the biochemical equation: $CH_3COOH + 2O_2$ becomes $2CO_2 + 2H_2O$. Bacillus also secretes enzymes, known as exoenzymes, which degrade proteins, fat and starch into smaller molecular units that can be metabolized by other bacteria downstream. During low oxygen conditions, Pseudomonas also reduce nitrate and nitrogen levels. In addition, Aerobacter ferments carbohydrates to produce short chain organic compounds, carbon dioxide ($CO_2$) and water ($H_2O$). The short chain organic compounds provide carbon and energy for Pseudomonas.

The overall environment in the first five treatment tanks is predominantly anaerobic. For septage, the initial BOD is greater than 1,000 mg/l. Suspended solids, which are made up largely of biodegradable and nonbiodegradable organic compounds, are normally present in the input septage at greater than about 500 mg/l.

During the first stage (treatment tanks 1–5), the primary objective is to reduce the BOD and suspended solids. Therefore, photosynthetic anaerobic bacteria thrive. Additionally, the type of plants desired at the beginning of the waste stream are hardy, i.e. able to withstand toxins, which have a well-established or quickly establishing root system to provide a substrate for the growth of the anaerobic microorganisms. The septage should remain in the anaerobic stage for at least one day for the embodiment under discussion.

The second stage of treatment generally occurs in treatment tanks 6–10 and takes place during the third and fourth days for a treatment center of the size and flow rate described above and illustrated in FIG. 1. This stage is characterized by higher dissolved oxygen levels than in the first stage i.e. it is predominately aerobic. In this stage, additional ammonia is removed by the two bacteria, Nitrosomonas and Nitrobacter. Nitrosomonas oxidizes ammonia to nitrite. Nitrobacter oxidizes the nitrites to nitrates. The overall formula from ammonia to nitrate is according to the chemical formula $2NH_3 + 4O_2$ become $2NO_3^- + 2H_2O + 2H^+$. Ammonia, nitrates and soluble orthophosphates are also directly removed from the water by green algae and bacteria growing on the roots of plants.

During the phase of treatment from treatment tanks 6–10, typical BOD levels are reduced to 50–150 mg/l and suspended solids are reduced to approximately 100 mg/l. Also during this stage, snails survive and significantly reduce the sludge volume by eating the sludge and converting some of it into energy, some into tissue and some of it into waste. The treated septage should remain in the aerobic phase for at least one day for the embodiment under discussion.

Turning to FIG. 1, approximately 2.5%–20% of the flow from treatment tank 5, at valve 54, is recycled through pipe 56 to treatment tank 1. This recycling replenishes the microbial community in treatment tank 1, which may have been depleted due to its harsh anaerobic conditions.

The end of the second group of treatment tanks 6–10 is characterized by predominately aerobic activity. In this environment, Aerobacter oxidizes carbohydrates and short chain organic acids to carbon dioxide ($CO_2$) and water ($H_2O$). Cellulomonas converts cellulose to soluble carbohydrates which it then uses for growth as a cell constituent and energy source. Other bacteria also use the produced carbohydrates.

Higher plants in the aerobic stage, treatment tanks 6–10, take up pollutants as nutrients. Certain higher plants (including Phragmites) take up nitrates preferentially, if certain other nutrients, such as potassium and soluble orthophosphate are present in the correct ratio. The nitrates are taken up directly and incorporated into the tissue of the plants. At this stage, faster growing plants that can rapidly remove nutrients are used. The root systems of these plants also reach deep into the treatment tanks and support a large population of grazing animals, particularly snails. Snails also eat and remove suspended solids in this manner. Phosphorus is also removed during this phase, being directly taken up by the plants and animals, being converted into tissue. By treatment tank 10, ammonia ($NH_3$) has been reduced to approximately 4 mg/l.

Turning now to the operation of the marsh, the marsh 22 is used primarily to kill unwanted bacteria and viruses and to remove heavy metals and certain toxic organic compounds. Profusely rooted plants, such as *Phragmites communis* are used to provide passage ways through the sand for the passage of water. As has been mentioned above, *Scirpus lacustrus* (bulrushes), *Iris pseudacorus* (yellow flag) and *Typha spp* (cattails) create an environment that is hostile to bacteria and also to certain viruses. Certain plants, particularly *Alnus glutinosa*, have nodules, known as rhizomes, along their roots. These rhizomes are the home of the bacteria Rhizobium, which fixes nitrogen (i.e., removes N directly from $N_2$ molecules in the air) and also produce an antibiotic, which kills certain other bacteria. Rhizobium are also found in many leguminous plants.

Figure 3:
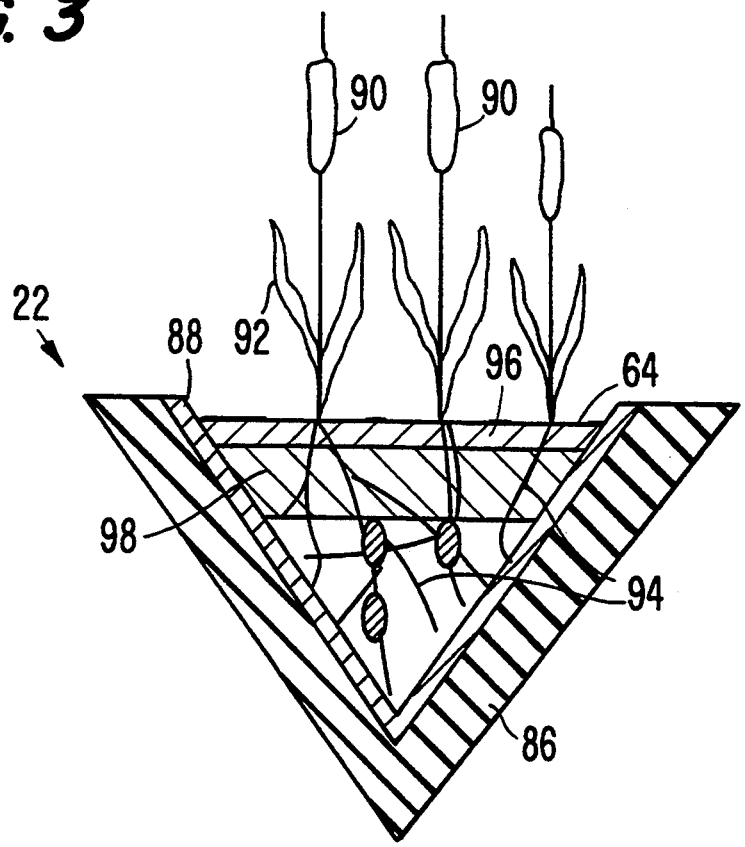
FIG. 3 is a schematic cross-sectional view of an artificial marsh of the apparatus of the invention.

These marsh plants 90 (FIG. 3) are also capable of preferentially taking up into their tissue certain metals and also toxic organic compounds. Absorption of heavy metals into fast growing plants does not present a waste disposal problem, because the plants grow so fast that the metals do not concentrate at a dangerous level. U.S. Pat. No. 3,770,623, to Seidel, hereby incorporated by reference identifies many different useful plants and their functions.

In addition, the plants transfer oxygen gas ($O_2$) from their leaves 92 to the root system 94. This activity provides additional aeration used by microorganisms remaining in the system that break down organic compounds. Denitrification, i.e., the reduction of nitrates ($NO_3$) to free Nitrogen ($N_2$) and water, continues in the marsh through the mechanism of metabolism. The environment of the marsh varies by virtue of depth. Certain parts 96 are aerobic and deeper zones 98 are anaerobic. At these stages, nitrates ($NO_3$) are converted into nitrogen gas ($N_2$) by action of bacteria.

If heavy metals present a significant problem, special marsh plants known as "hypoaccumulators" should be provided. Hypoaccumulators selectively accumulate specific metals in a concentration high enough so that the metals may be smelted from or refined from the plants according to known methods. Examples of hypoaccumulators are umbrella plant and some species of willow plants, both of which accumulate toxic aluminum.

The effluent from the marsh is passed through T-valve 72 (FIG. 1). A pump 73 recycles a portion of the marsh effluent through pipe 74 back to the input of treatment tank 1. Approximately 2.5%–20% of the effluent should be recycled. This provides another route for microorganism replenishment as discussed above. The remaining effluent from the marsh is pumped by pump 73 through pipe 76 to treatment tank 11.

Treatment tanks 11–20 principally provide for polishing of the treated wastewater By "polishing" it is meant that the water quality is improved to a fine degree and that additional nutrients are removed. Snails and fresh water clams in these sections continue to digest sludge and are in turn eaten by the fish, including small-mouthed bass and river trout. In the experimental Harwich septage system described above, ammonia ($NH_3$) is reduced by treatment tank 20 to less than 1 mg/l and phosphorus is reduced to less than 10 mg/l. Total Kjeldahl nitrogen is reduced to less than 10 mg/l. Suspended solids are reduced from over 500 mg/l to less than 10 mg/l and BOD is reduced from over 1,000 mg/l to less than 10 mg/l. Fecal coloform are reduced to below 100, less than 99% of influent and total coloform was reduced to below 1,000, also less than 99% of influent. It is beneficial for the treated septage to remain in this polishing section for at least three days, for the embodiment under discussion.

The fish in the last several treatment tanks reduce the plankton population and are also used as water quality indicators. Generally, if the water quality is poor, the fish will evidence symptoms that will help diagnose the problem.

It is also beneficial to maintain the ratio of carbon, in the form of calcium carbonate, to the combined ammonia and nitrate concentration in a predetermined range. For the system discussed above, it has been discovered that this ratio is 7-to-1. This ratio should be maintained in the first treatment tank of the first plurality of treatment tanks. For instance, if calcium carbonate is present at 210 mg/l and the combined ammonia and nitrates amount to 30 mg/l, the system should perform adequately. The ratio tends to reduce as the system operates and thus limestone must be added to increase the calcium carbonate content. In addition to calcium carbonate, sodium bicarbonate can be used to increased alkalinity. Sodium bicarbonate acts more quickly than does calcium carbonate.

With respect to the general operation of the system, of course, variations in plant and animal placement may arise. The general rule of thumb is that if an organism survives in a certain location, it should be used there and if it does not, then it should not. If it survives, this means that it is extracting what it requires as nutrients from the water. If it does not survive, then it is not getting what it needs and thus, is not performing any useful water treatment function. One can think of treatment of wastewater as harvesting nutrients from the water, using the plants, animals and bacteria as collectors. If they survive, then they must be removing pollutants. Variations of environment with the seasons will generally require variation in plant location.

Because conditions are not always apt for the survival of all plants, animals and microorganisms, the diversity in the system tends to decrease over time. Thus, the plant, animal, and microbial species must be replenished periodically to maintain diversity. Plant species can be observed visually and thus need only be replenished when the diversity is observed to have diminished. With respect to bacterial and other microbial diversity, a periodic regimen should be adopted.

In colder climates, it is necessary to insulate the system from cold. This can be accomplished by building a conventional greenhouse around the system. A greenhouse 100 is shown schematically in FIG. 4, surrounding six modules 84 of treatment tanks and marshes, as discussed above. Normal greenhouse technology should be applied. Additionally, the treatment tanks provide a thermal capacitance which helps regulate the temperature. Further, the photosynthetic bacteria trap light energy. The chemical reactions mediated by the bacteria are, on balance, exothermic (i.e. they give off heat), and thus the treatment tank temperature is maintained without a need for externally applied heat, from sources other than the sun or the artificial lights, if used. As has been mentioned above, the capacity of the system is largely limited by the absorptive and transmissive properties of the wastewater with respect to light. As noted above, it is possible to increase the capacity somewhat by increasing the height of the treatment tanks. It is also possible to use supplemental artificial light for natural light embodiments, such as the axially located light source embodiment discussed above. This increases the capacity of the system by a factor of approximately four. Further, the system is relatively straight forward to set up and may be considered as a modular element of a larger system having many similar modules. As many modules as are necessary to fully treat a municipality's wastewater may be provided. The system described above, which is capable of treating at least 1,200 gallons a day, occupies a space of approximately 1,200 ft.$^2$.

Figure 12:
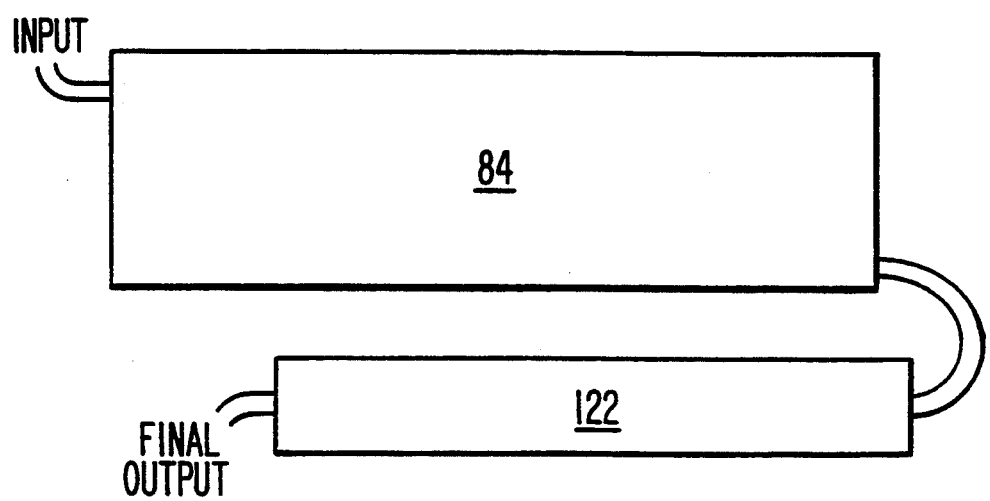
FIG. 12 is a schematic plan view showing an embodiment of the apparatus of the invention including a second marsh at the output end of the system.

The configuration of the system may be altered, for instance by providing a U-shaped marsh, by placing all of the treatment tanks in a single file, dividing the treatment tanks up into two or three ranks, etc. The possibilities are virtually limitless. It is also sometimes beneficial to rearrange the order of the marsh with respect to the treatment tanks. For instance, in treating wastewater that has high levels of heavy metals, the marsh can be introduced earlier in the system. Further, in order to accommodate varying seasonal pollutants, the marsh could actually be mobile, on a small railroad car-type setup. Alternatively, because the marsh is simply connected to the wastewater treatment tank stream through plumbing, the plumbing can easily be rerouted at various times during the year in order to customize the particular flow then needed. It may be beneficial to add a second marsh stage 122 after the final treatment tank stage of the system 84, to sterilize the water (FIG. 12).

It is also possible to introduce the components of the system, in particular the treatment tanks, into any stage of a conventional waste treatment system, so long as chemicals introduced by the waste treatment system are not introduced at a stage in the natural system that will kill the natural constituents.

Finally, variations in light and temperature during operation of the system are beneficial, in that the variation allows for a varying habitat for the various organisms living in the system. Some function well in lighted environments and some in dark. Thus, the daily application of natural sunlight alternating with unilluminated periods of night time darkness are beneficial. Further, some organisms function better in cooler (or warmer) conditions than do others. The experimental Harwich system experienced daily temperature fluctuations of at least 20° F., within the overall range of form 50° F. to 100° F., with beneficial results.

The foregoing description shall be considered to be illustrative and shall not be considered limiting in any way. Variations within the scope of the invention will be understood by those of ordinary skill in the art.

Having thus described the invention, what is claimed is:

1. A method for treating water comprising:
   (a) connecting a plurality of tanks each capable of holding water in series such that water can be transferred along said series of tanks from a first tank to a last tank, wherein each of said tanks comprises a bottom and light-transmitting sides;
   (b) stocking said tanks with water and organisms for removing pollutants from the water,
   (c) inputting water containing pollutants to the first tank; and
   (d) outputting water from which said pollutants have been removed from the last tank.

2. The method of claim 1, further comprising providing a light-transmitting roof under which said series of tanks are disposed.

3. The method of claim 1, further comprising recycling water between tanks in said series of tanks.

4. The method of claim 1, further comprising aerating water in at least one of the tanks.

5. The method of claim 1, further comprising agitating water in at least one of the tanks.

6. The method of claim 1, further comprising connecting a marsh to said series of tanks such that water is transferred therethrough, said marsh comprising an aggregate bed including sand, and stocking said marsh with plants for removing pollutants from water in the marsh.

7. The method of claim 1, wherein the sides of the tanks are light-transmitting over their entire area.

8. The method of claim 1, wherein the sides of the tanks transmit sufficient light to reach the entire volume of water contained therein before said tanks are stocked with organisms.

9. The method of claim 1, comprising:
   stocking a first tank water containing water with bacteria for removing at least some of the pollutants from the water contained therein;
   stocking a second tank connected in series with said first tank with non-aquatic plants capable of removing at least some of the pollutants from the water, and providing a support for maintaining the non-aquatic plants at the surface of water; and stocking a third tank connected in series with said second tank with fish capable of removing at least some of the pollutants from the water.

10. The method of claim 9, further comprising providing a light-transmitting roof under which said series of tanks are disposed.

11. The method of claim 9, further comprising recycling water between tanks in said series of tanks.

12. The method of claim 9, further comprising aerating water in at least one of the tanks.

13. The method of claim 9, further comprising agitating water in at least one of the tanks.

14. The method of claim 9, further comprising connecting a marsh to said series of tanks such that water is transferred therethrough, said marsh comprising an aggregate bed including sand, and stocking said marsh with plants for removing pollutants from water in the marsh.

15. The method of claim 9, wherein the sides of the tanks are light-transmitting over their entire area.

16. The method of claim 9, wherein the sides of the tanks transmit sufficient light to reach the entire volume of water contained therein before said tanks are stocked with organisms.

17. The method of claim 1, further comprising maintaining the ratio of concentration of calcium carbonate to concentration of ammonia and nitrate in at least one of said tanks within a predetermined range.

* * * * *